(12) United States Patent
Conti (10) Patent No.: US 10,429,003 B2
(45) Date of Patent: *Oct. 1, 2019

(54) MAGNETIC OBJECT SUSPENSION APPARATUS AND ASSOCIATED METHODS AND SYSTEMS

(71) Applicant: CONTI-BROS, INC., Greenville, SC (US)

(72) Inventor: Brian Vincent Conti, Matthews, NC (US)

(73) Assignee: CONTI-BROS, INC., Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/923,798

(22) Filed: Mar. 16, 2018

(65) Prior Publication Data

US 2018/0202602 A1 Jul. 19, 2018

Related U.S. Application Data

(63) Continuation of application No. 15/270,800, filed on Sep. 20, 2016, now Pat. No. 9,920,877.

(60) Provisional application No. 62/233,742, filed on Sep. 28, 2015.

(51) Int. Cl.
| | | |
|---|---|---|
| A47G 1/17 | (2006.01) | |
| F16M 13/02 | (2006.01) | |
| B65D 51/24 | (2006.01) | |
| A47G 23/02 | (2006.01) | |
| F16B 11/00 | (2006.01) | |
| F16B 1/00 | (2006.01) | |
| F25D 25/00 | (2006.01) | |

(52) U.S. Cl.
CPC ........... *F16M 13/027* (2013.01); *A47G 23/02* (2013.01); *B65D 51/242* (2013.01); *A47G 2200/106* (2013.01); *B65D 2313/04* (2013.01); *F16B 11/006* (2013.01); *F16B 2001/0035* (2013.01); *F25D 25/00* (2013.01); *F25D 2331/803* (2013.01)

(58) Field of Classification Search
USPC ... 248/683, 205.3, 206.5, 311.3, 312, 312.1; 206/350, 818; 211/71.01, 74, DIG. 1
See application file for complete search history.

(56) References Cited

U.S. PATENT DOCUMENTS

| | | |
|---|---|---|
| 1,984,610 A | 12/1934 | Warren |
| 2,217,514 A | 10/1940 | Henry |
| 2,590,149 A | 3/1952 | Burdett |
| 2,730,262 A | 1/1956 | Reams |
| 2,921,690 A | 1/1960 | Smith et al. |

(Continued)

*Primary Examiner* — Terrell L McKinnon
*Assistant Examiner* — Michael McDuffie
(74) *Attorney, Agent, or Firm* — Burr & Forman LLP (57) ABSTRACT

Apparatuses for magnetically suspending an object within a space are provided with associated methods and systems. One example apparatus includes a carrier including a chamber and a focusing member coupled to the carrier. The apparatus may further include a magnet disposed in contact with the focusing member such that an attraction surface of the magnet is exposed by the chamber to permit direct contact between the magnet and the item. The focusing member may be formed to focus a magnetic field of the magnet towards the attraction surface. Additional example apparatuses, as well as systems and methods are also provided.

20 Claims, 8 Drawing Sheets

(56) References Cited

U.S. PATENT DOCUMENTS

| | | | |
|---|---|---|---|
| 3,001,678 A | 9/1961 | Maxwell | |
| 4,008,810 A * | 2/1977 | Merz | A47G 23/0208 |
| | | | 211/162 |
| 4,070,735 A | 1/1978 | Canaday | |
| 4,455,894 A | 6/1984 | Roberts | |
| 4,480,361 A | 11/1984 | Morita | |
| 4,544,067 A | 10/1985 | Miller | |
| 4,802,580 A | 2/1989 | Andersen | |
| 4,905,949 A | 3/1990 | Cosgrove | |
| 5,368,203 A * | 11/1994 | Friedrich | A47G 19/24 |
| | | | 206/818 |
| 5,405,004 A * | 4/1995 | Vest | B25H 3/06 |
| | | | 206/350 |
| 5,544,747 A | 8/1996 | Horn | |
| 5,678,701 A | 10/1997 | Anderson | |
| 5,704,495 A | 1/1998 | Bale et al. | |
| 5,769,246 A * | 6/1998 | Estep | A47J 47/16 |
| | | | 211/70.6 |
| 5,794,904 A | 8/1998 | Hackley | |
| 5,873,486 A | 2/1999 | Morgan | |
| 5,895,018 A | 4/1999 | Rielo | |
| 5,947,439 A * | 9/1999 | Florey | A47K 5/05 |
| | | | 248/206.5 |
| 6,193,201 B1 | 2/2001 | Babcock | |
| 6,193,202 B1 | 2/2001 | Rogers | |
| 6,220,458 B1 | 4/2001 | Falor | |
| 6,345,723 B1 | 2/2002 | Blake et al. | |
| 6,729,591 B2 | 5/2004 | Hsu | |
| 7,007,818 B2 | 3/2006 | Martin | |
| 7,017,759 B1 | 3/2006 | Friend | |
| 7,131,545 B1 | 11/2006 | Grogan | |
| 7,190,248 B2 | 3/2007 | Coleman, Jr. et al. | |
| 7,409,892 B2 | 6/2008 | Monk | |
| 7,464,907 B1 | 12/2008 | Lane | |
| 7,740,214 B2 * | 6/2010 | Marsilio | A47F 7/024 |
| | | | 248/178.1 |
| 7,748,569 B2 | 7/2010 | Sunatori | |
| 8,215,598 B1 | 7/2012 | Hausberger | |
| 8,262,042 B2 | 9/2012 | Sandy | |
| 8,272,506 B1 | 9/2012 | Flannery et al. | |
| 8,381,949 B2 * | 2/2013 | Sunatori | B65D 83/06 |
| | | | 211/DIG. 1 |
| 8,398,155 B2 * | 3/2013 | Andochick | B60R 11/00 |
| | | | 224/483 |
| 8,544,695 B2 * | 10/2013 | Gordon | A47K 5/122 |
| | | | 222/180 |
| 8,550,235 B2 * | 10/2013 | Suderman | F16B 7/0433 |
| | | | 198/690.1 |
| 8,701,924 B2 * | 4/2014 | Dalbec | B65D 51/24 |
| | | | 220/480 |
| 8,967,562 B1 | 3/2015 | Bileth | |
| 9,635,964 B1 * | 5/2017 | Martinez-Schiferl | A47G 19/24 |
| 2004/0089621 A1 * | 5/2004 | Gangloff | A47B 73/004 |
| | | | 211/74 |
| 2004/0173719 A1 | 9/2004 | Mitchell | |
| 2011/0017070 A1 | 1/2011 | Qin | |
| 2012/0043348 A1 * | 2/2012 | Sunatori | B65D 51/242 |
| | | | 222/142.3 |
| 2013/0221172 A1 | 8/2013 | Owen et al. | |
| 2014/0263895 A1 * | 9/2014 | Dickenson | B60R 13/0206 |
| | | | 248/206.5 |
| 2014/0284440 A1 * | 9/2014 | Marotti | A47B 73/004 |
| | | | 248/206.5 |
| 2015/0128491 A1 | 5/2015 | Aller et al. | |

\* cited by examiner

MAGNETIC OBJECT SUSPENSION APPARATUS AND ASSOCIATED METHODS AND SYSTEMS

CROSS-REFERENCE TO RELATED APPLICATIONS

This application is a continuation of U.S. application Ser. No. 15/270,800 filed on Sep. 20, 2016, which claims the benefit of U.S. Application No. 62/233,742 filed on Sep. 28, 2015, the entire contents of which are hereby incorporated by reference.

TECHNOLOGICAL FIELD

Various embodiments of the present invention relate generally to organizational and optimal space utilization systems and associated methods.

BACKGROUND

In any physical space there is always a desire to maximize the utilization of that space and avoid unused or wasted space. Space-saving technologies continue to evolve and be implemented in new and unexpected ways, largely fueled by the demand to maximize space utilization and organization. Spaces that can benefit from these technologies include, but are not limited to, closets, garages, cabinets, refrigerators, or any other enclosed space. In addition to space saving, there is a continued demand for convenient organization solutions that place a desired object in an easy-to-access location. As such, convenient, organized, space optimizing technologies for these and other physical spaces will continue to be in high demand, thereby spurring innovation to meet the consumer's needs and desires.

BRIEF SUMMARY

Some example embodiments are therefore described that provide for suspending an item. According to some example embodiments, an apparatus for suspending an item is provided. The apparatus may include a carrier including a chamber and a focusing member, for example, a focusing cup coupled to the carrier. The focusing cup may have a cavity and the focusing cup may be comprised of a ferrous material. The apparatus may further include a magnet disposed within the cavity of the focusing cup such that an attraction surface of the magnet is exposed by an opening of the cavity and the chamber to permit direct contact between the attraction surface of magnet and the item. The focusing cup may be formed to focus a magnetic field of the magnet towards the attraction surface.

According to some example embodiments, an example method of assembling an apparatus for suspending an item is provided. The example method may include providing a carrier, where the carrier includes a chamber. The example method may further include affixing a magnet in contact with a focusing, which according to some embodiments may be a focusing cup. The magnet may be affixed within a cavity of the focusing cup, where the focusing cup is comprised of a ferrous material. Additionally, the example method may include coupling the focusing cup to the carrier, where the magnet is disposed within the cavity of the focusing cup such that an attraction surface of the magnet is exposed by an opening of the cavity and the chamber of the carrier to facilitate direct contact between the magnet and the item. The focusing cup is formed to focus a magnetic field of the magnet towards the attraction surface.

According to some embodiments, an example system may be provided. The Example systems may include a container having a ceiling and an apparatus for suspending an item from the ceiling. The apparatus may include a carrier including a chamber and a focusing member, possibly in the form of a focusing cup coupled to the carrier. The focusing cup may have a cavity and the focusing cup may be comprised of a ferrous material. The apparatus may further include a magnet disposed within the cavity of the focusing cup such that an attraction surface of the magnet is exposed by an opening of the cavity and the chamber of the carrier to permit direct contact between the magnet and the item. The focusing cup may be formed to focus a magnetic field of the magnet towards the attraction surface.

BRIEF DESCRIPTION OF THE SEVERAL VIEWS OF THE DRAWING(S)

Having thus described various example embodiments of the invention in general terms, reference will now be made to the accompanying drawings, which are not necessarily drawn to scale, and wherein:

DETAILED DESCRIPTION

Some example embodiments of the present invention or inventions will now be described more fully hereinafter with reference to the accompanying drawings, in which some, but not all embodiments are shown. Indeed, the various example embodiments may take many different forms and the inventions should not be construed as being limited to the example embodiments set forth herein; rather, these example embodiments are provided so that this disclosure will satisfy applicable legal requirements. Like reference numerals refer to like elements throughout.

According to various example embodiments, an apparatus or device for suspending an item is provided. The apparatus may be affixed to a ceiling of a container, such as a refrigerator compartment. The apparatus may employ one or more magnets to attract and suspend an item having a ferrous materiel that is a component of an item. According to some example embodiments, the item may be a beverage bottle having a ferrous metal cap, e.g., a steel cap. The beverage bottle may be suspended by the apparatus due to the magnet's attraction to the cap of the bottle. The magnet may be formed to have a sufficient magnetic pull or force to suspend the weight of a beverage bottle with fluid inside. Further, physical features of the apparatus may be included to assist or supplement the apparatus' ability to suspend an item, such as, for example, a beverage bottle in a secure manner.

Figure 1:
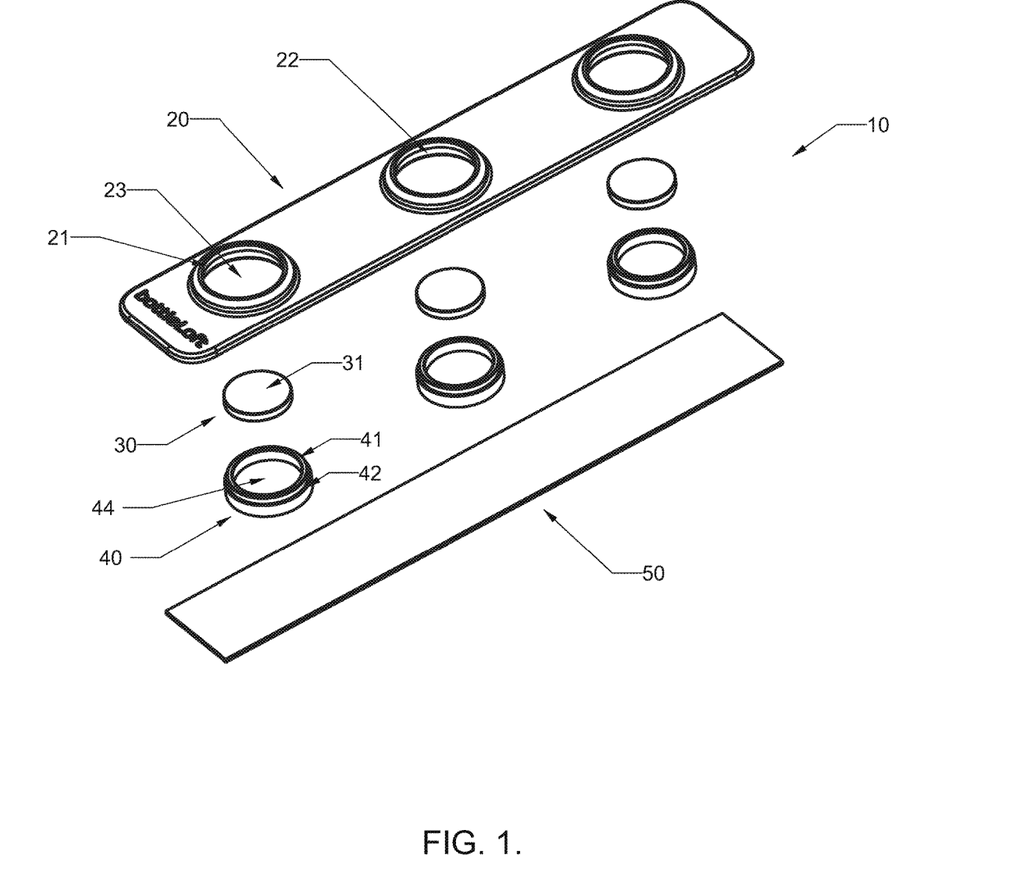
FIG. 1 is an exploded view of an apparatus for suspending an item according to an example embodiment.

FIG. 1 illustrates an exploded view of an example apparatus for suspending an item according to various example embodiments. The item suspension apparatus 10 is depicted as having three item suspension locations, but for ease of understanding the example embodiments are described with respect to one of the item suspension locations. One of skill in the art would appreciate that an apparatus for suspending an item could be formed with any number of item suspension locations such as, for example, a single item suspension location. Further, with respect to the example embodiment shown in FIG. 2 and otherwise herein, the components included for each of the three item suspension locations may be substantially identical with the exception of physical placement.

According to some example embodiments, item suspension apparatus 10 may include a carrier 20, a magnet 30, and a focusing cup 40. The carrier 20 may be constructed of any non-ferrous material, such as, for example, plastic. In this regard, the carrier 20 may be injection molded. The carrier 20 may include an aperture 23 that is sized to reveal the magnet 30 and the focusing cup 40 when the item suspension apparatus 10 is assembled. According to some example embodiments, the carrier 20 may include a raised or protruding feature 21 around the aperture 20, which forms a chamber 24. The protruding feature 21 may include features on an interior surface of the chamber 24 such as a seat 22. The seat 22 may be formed by an extended portion or overhang that extends towards a center of the aperture 23 and into the chamber 24 and may be configured to receive a ledge 42 of the focusing cup 40 and, according to some example embodiments, prevent the focusing cup 40 from passing through the aperture 23. In this regard, the width or diameter of the aperture 23 may be less than the width or diameter of the focusing cup 40. Further, while the aperture 23, the focusing cup 40, and the magnet 30 are illustrated in FIG. 1 as having a circular structure, it is contemplated that the aperture 23, the focusing cup 40, and the magnet 30 may be of a different shaped structure, such as, for example, square or rectangular.

Figure 6:
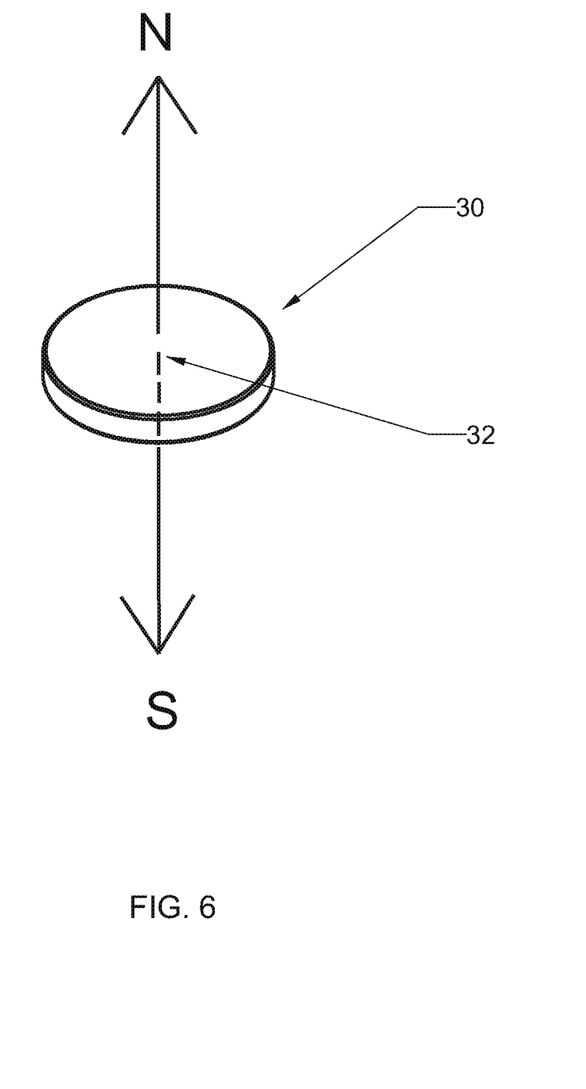
FIG. 6 is an image of a magnet according to some example embodiments.

According to various example embodiments, the magnet 30 may be a permanent magnet. In this regard, the magnet 30 may be a rare earth or neodymium magnet. The magnet 30 may have an attraction surface 31 that is directly exposed to the suspended item via the aperture 30 of the carrier 20 and an opening in the cavity 44 of the focusing cup 40 when the magnet 30 is disposed within the cavity 44 and the focusing cup 40 is inserted into the chamber 24 of the carrier 20 formed by the aperture 23 and the protruding feature 21. According to various example embodiments, the magnet 30 may have a cylindrical shape and may have a diameter that is less than the diameter of the opening of the cavity 44 of the focusing cup 40 so that the magnet 30 may be received within the cavity 44 of the focusing cup 40. According to various example embodiments, the magnet 30 may be axially magnetized about a center point 32 of the magnet 30 and the attraction surface 31, as shown in FIG. 6. Again, while the magnet 30 is illustrated as being a cylinder, one of skill in the art would appreciate that the magnet 30 may be formed in the shape of, for example, a cube or a rectangular block and the focusing cup 40 may be similarly structured to receive the magnet 30.

The focusing cup 40 may be comprised of a ferrous material, such as, for example, steel. The focusing cup 40 may be specifically formed receive the magnet 30 into the cavity 44 of the focusing cup 40. In this regard, the cavity 44 of the focusing cup 40 may enclose the magnet 30 on the magnet's bottom and side surfaces, while exposing the attraction surface 31 of the magnet 30, where the bottom surface of the magnet is the surface opposite the attraction surface 31. By bounding the magnet 30 on the side and bottom surfaces, the focusing cup 40 affects the magnetic field of the magnet in a manner that focuses the field in the direction of the cavity 44's opening and magnet 30's attraction surface 31. By doing so, the maximum magnetic field is oriented toward the item to suspend. As such, the architecture of the focusing cup 40 operates to focus the magnetic field to permit the magnet 30 to suspend items that are heavier than the magnet 30 would be capable of suspending in the absence of the focusing cup 40. The magnet 30 may be bonded to the focusing cup 40 by an adhesive or press fit into the focusing cup 40 to permit the unit of the focusing cup 40 and the magnet 30 to be inserted into the chamber 24 of the carrier 20 during assembly of the item suspension apparatus 10.

The focusing cup 40 may include a lip 41 and a ledge 42. The lip 41 may be disposed about the top edge of the cavity 44 and may define the opening of the cavity 44. The ledge 42 may be dispose on an external side surface of the focusing cup 40 and may extend radially from a center point of the focusing cup 40. As described above and otherwise herein, the ledge 42 may be formed to engage a seat 22 on an interior surface of a protruding feature 21 of the carrier and thereby couple the focusing cup 40 to the carrier 20. Additionally, the lip 41 of the focusing cup 40 may extend upwards, beyond the ledge 42 thereby extending the cavity 44.

The item suspension apparatus 10 may also include an adhesive 50. The adhesive 50 may be embodied as a strip with an adhesive product disposed on both sides. The adhesive may be any type of adhesive, such as, for example, a glue, a solvent cement, or the like. The adhesive 50 may be applied to the carrier 20 for attaching the item suspension apparatus 10 to a ceiling surface within a space or container. The adhesive strip may operate to hold the focusing cup 40 within a chamber 24 of the carrier 20 formed by the protruding feature 21 and the aperture 23 to secure the focusing cup 40 in engagement with the carrier 20. In this regard, the adhesive strip may engage both the focusing cup 40 and the back surface of the carrier 20. Additionally, according to some example embodiments, the other surface of the adhesive strip (opposite the surface engaged with the carrier 20 and the focusing cup 40) may operate to affix the item suspension apparatus 10 to a ceiling or other surface of a container, such as, for example a compartment of a refrigeration unit configured to control the temperature within the compartment.

Figure 2:
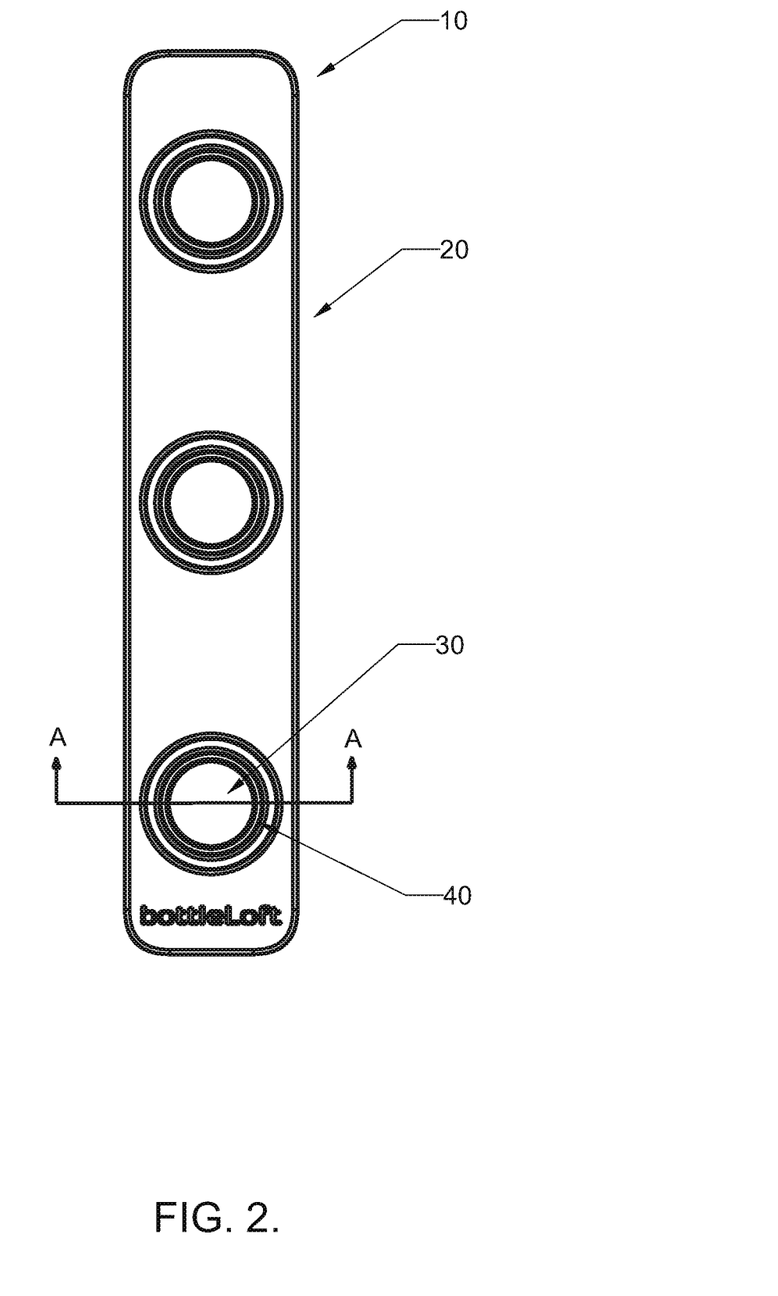
FIG. 2 is front view of an apparatus for suspending an item according to an example embodiment.
Figure 3:
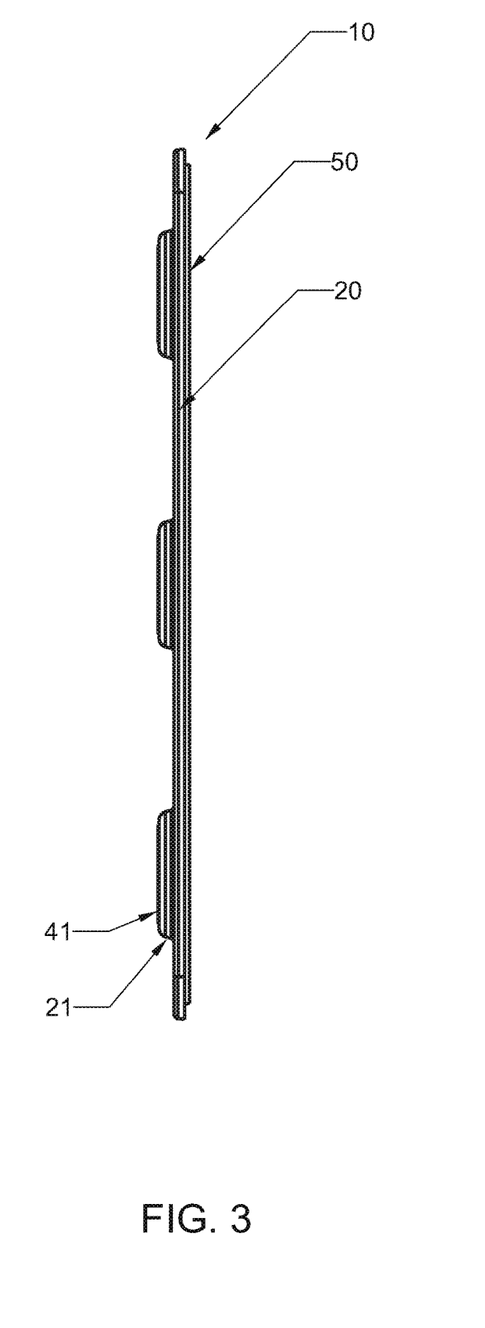
FIG. 3 is side view of an apparatus for suspending an item according to an example embodiment.
Figure 4:
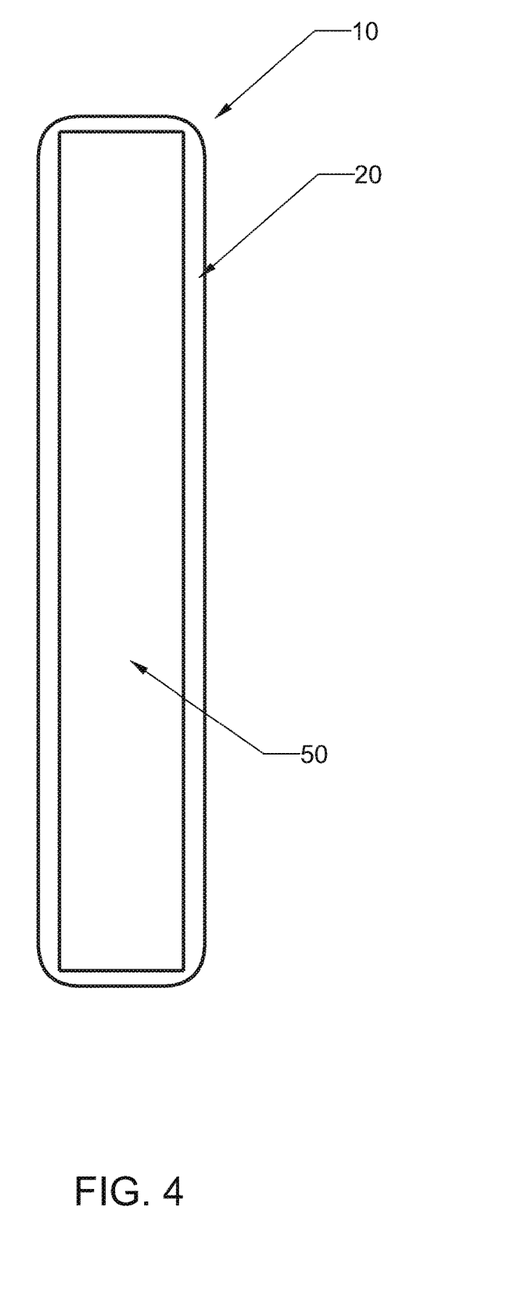
FIG. 4 is a back view of an apparatus for suspending an item according to an example embodiment.

FIGS. 2-4 illustrate various perspective views of an assembled item suspension apparatus 10, according to various example embodiments. FIG. 2 is a front view of an item suspension apparatus 10. It can be seen in FIG. 2 that, according to some example embodiments, the magnet 30 and the lip 41 of the focusing cup 40 may be exposed by the aperture 23 of the carrier 20. FIG. 3 is a side view of the item suspension apparatus 10, which shows the protruding feature 21 of the carrier 20 and the lip 41 of focusing cup 40 extending beyond (or past) the protruding feature 21. The adhesive 50 is also shown as being applied to the back surface of the carrier 20 and the focusing cup 40. FIG. 4 is a back view of the item suspension apparatus 10 with the adhesive 50 applied to the back surface of the carrier 20.

Figures 5A, 5B:
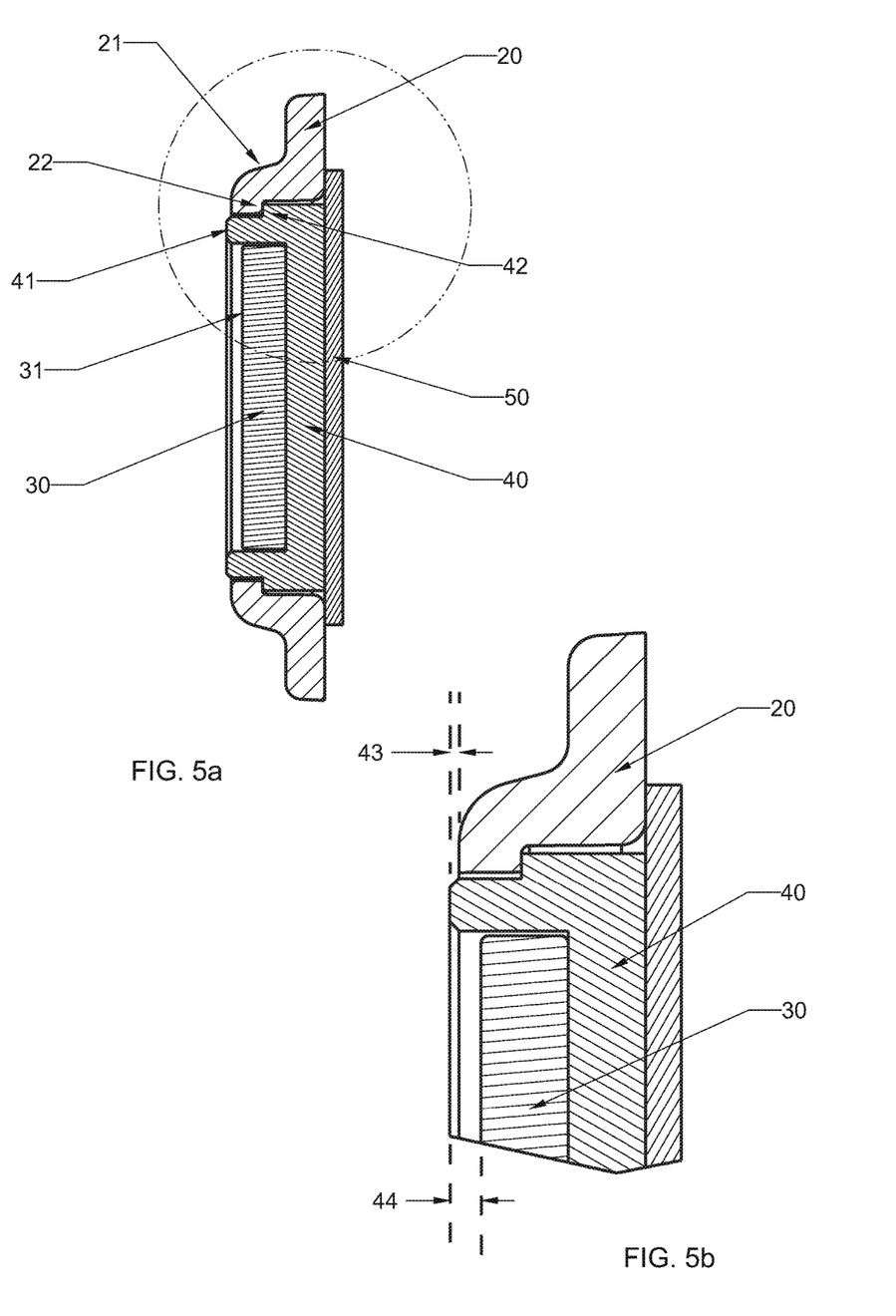
FIG. 5a is a cross-section view of a portion of an apparatus for suspending an item at the section line A-A of FIG. 2 according to an example embodiment.
FIG. 5b is a zoomed in view of a portion of the cross-section of FIG. 5a according to an example embodiment.

FIG. 5a illustrates a cross-section view of the item suspension apparatus 10 at the cross-section line A-A of FIG. 2. As such, FIG. 5a illustrates the internal components of the item suspension apparatus 10 in an assembled form. As described above, the carrier 20 includes seat 22 of the protruding feature 21 that extends towards a center point of the aperture 23 and a chamber 24 of the carrier 20 formed by the protruding feature 21 and aperture 23. As such, seat 22 may engage or couple with the ledge 42 of the focusing cup 40 to seat the focusing cup 40 within the chamber 24. Further, the magnet 30 may be disposed within the cavity 44 of the focusing cup 40. The magnet 30 may be disposed within the cavity 44 of the focusing cup 40 such that the attraction surface 31 of the magnet 30 is exposed by an opening of the cavity 44 and the aperture 23 of the carrier 20 to permit direct contact between the magnet 30 and an item. As described above, the focusing cup 40 may be formed to focus a magnetic field of the magnet 30 towards the attraction surface 31. The adhesive 50 may be applied to the back surface of the carrier 20 and the back surface of the focusing cup 40 to hold the focusing cup 40 in the chamber 24 formed by the protruding feature 21 and the aperture 23.

In FIG. 5a, it can be seen that, according to some example embodiments, the depth of the cavity 44 of the focusing cup 40 may be more than the height of the magnet 30. Further, it can be seen, that, according to some example embodiments, the lip 41 of the focusing cup 40 extends beyond the front surface of the protruding feature 21 of the carrier 20. The details of these features can be better seen with reference to FIG. 5b, which is a zoomed in view of the encircled portion of FIG. 5a. In this regard, distance 43 in FIG. 5a illustrates that the lip 41 of the focusing cup 40 extends beyond the front surface of the protruding feature 21 of the carrier 20. Further, distance 44 illustrates that the depth of the cavity 44 of the focusing cup 40 is more than the height of the magnet 30. As such, the focusing cup 40 may define a lip 41 about the opening of the cavity 44 of the focusing cup 40, and the attraction surface 31 of the magnet 30 may be recessed into the cavity 44 relative to the lip 41 of the focusing cup 40.

According to various example embodiments, the extended portion of the lip 41 and the recessed disposition of the magnet relative to the lip 41 provide features that can assist in securing an item in a suspended position, even if jostled. For example, a bottle cap may have a convex crown portion that may be received into the cavity 44 of the focusing cup 40, and come into direct contact with the attraction surface of the magnet 30. The extended lip 41 and the recessed magnet 30 operate to allow a bottle having a convex crown cap to settle into the recess, even if the bottle is jostled or bumped. These features permit the bottle to pendulum in position, while contacting the magnet 30 and the focusing cup 40, but then quickly settle back into a stationary position.

Figure 7:
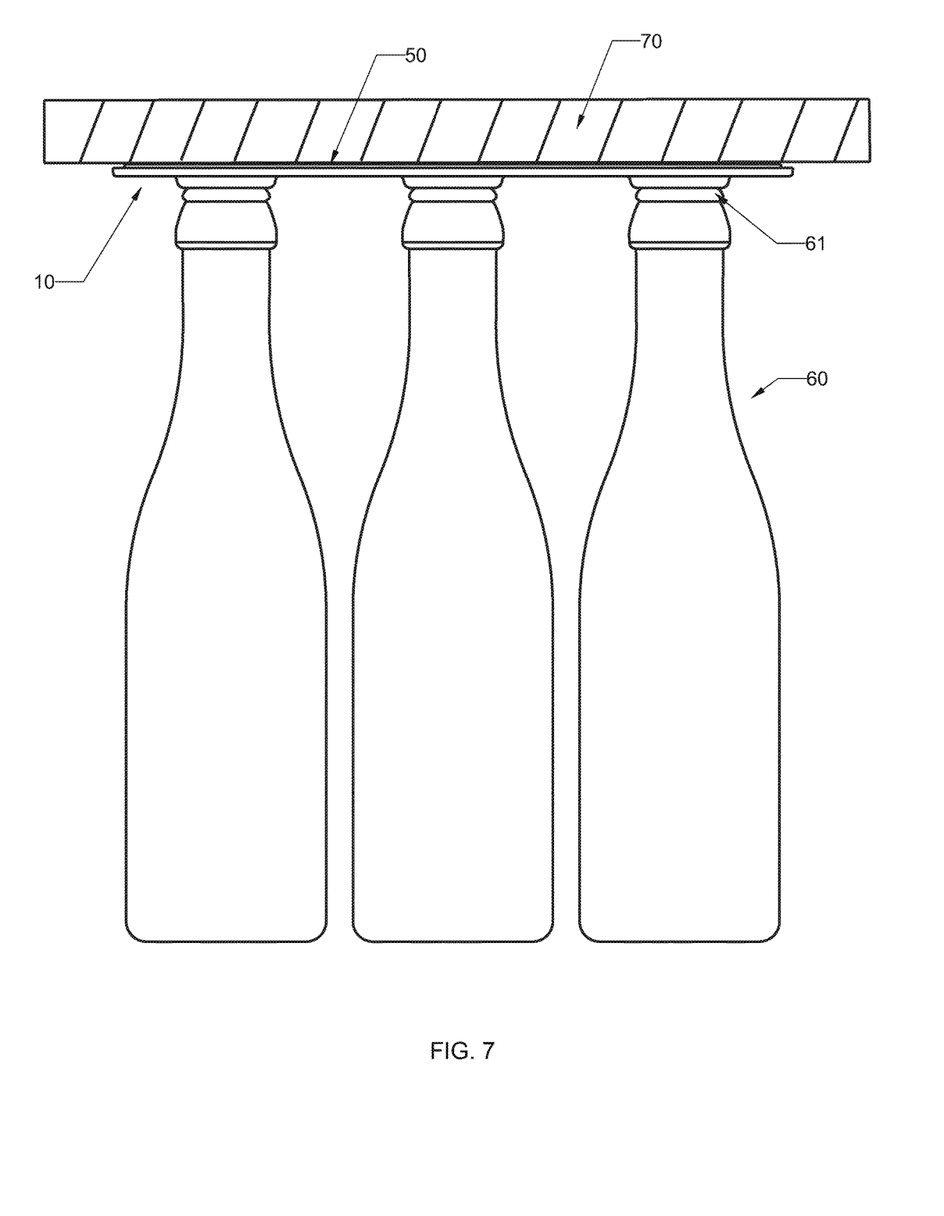
FIG. 7 is a side view of an apparatus for suspending an item while the apparatus is suspending, for example, a plurality of bottles according to an example embodiment.

FIG. 7 illustrates an implementation of an item suspension apparatus 10 according to various example embodiments to suspend an item, e.g., a bottle 60, within a system that may include a container. The bottle 60 may be, for example, a glass beverage bottle having a steel cap 61. The item suspension apparatus 10 may be affixed to a ceiling 70 of a container. In this regard, the container may be a refrigerator, cooler, pantry, closet, garage, cabinet, oven, or the like. The container may include a plurality of walls, e.g., ceiling 70, having temperature controlling insulation. According to some example embodiments, the item suspension apparatus 10 may be affixed to the ceiling by an adhesive 50. However, according to some example embodiments, the carrier 20 of the item suspension apparatus 10 may be integrated into the ceiling, thereby not requiring an adhesive to attach the item suspension apparatus to the ceiling. FIG. 7 further illustrates that three bottles may be suspended by an item suspension apparatus at three different item suspension locations. The item suspension locations may be associated with respective apertures and chambers of the carrier. The plurality of apertures may be spaced apart such that each bottle suspended in association with each aperture does not physically engage an adjacent bottle.

Figure 8:
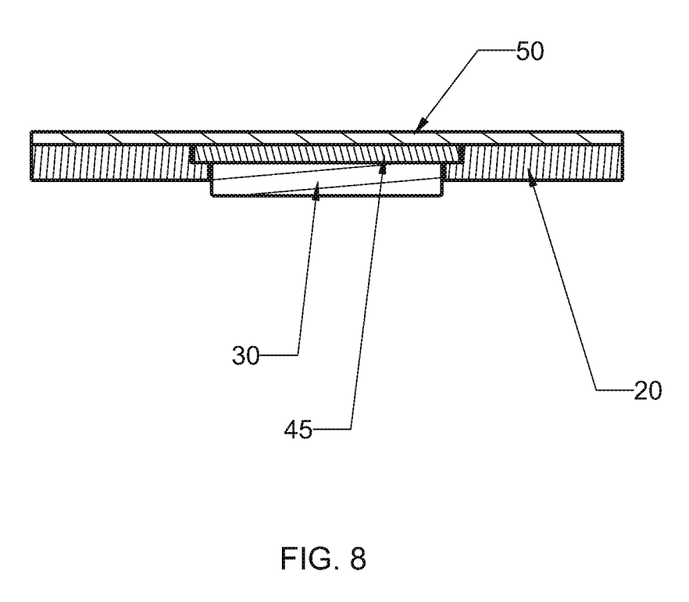
FIG. 8 is a cross-section view of a portion of an apparatus for suspending an item according to an example embodiment.

FIG. 8 is a cross-section view of a portion of another example apparatus for suspending an item according to an example embodiment. The apparatus of FIG. 8 includes a carrier 20 having a seat, a magnet 30, and an adhesive 50, similar to the example embodiments of FIGS. 1-5b. However, in the example apparatus of FIG. 8, the focusing member takes the form of a focusing plate 45. The magnet 30 may be affixed to the focusing plate 45, but unlike the focusing cup 40, the focusing plate does not include a cavity 44. Focusing plate 45 may still include a ledge that engages the seat of the carrier 20 to couple the assembly of the magnet 30 and the focusing plate 45 to the carrier 20.

Figure 9:
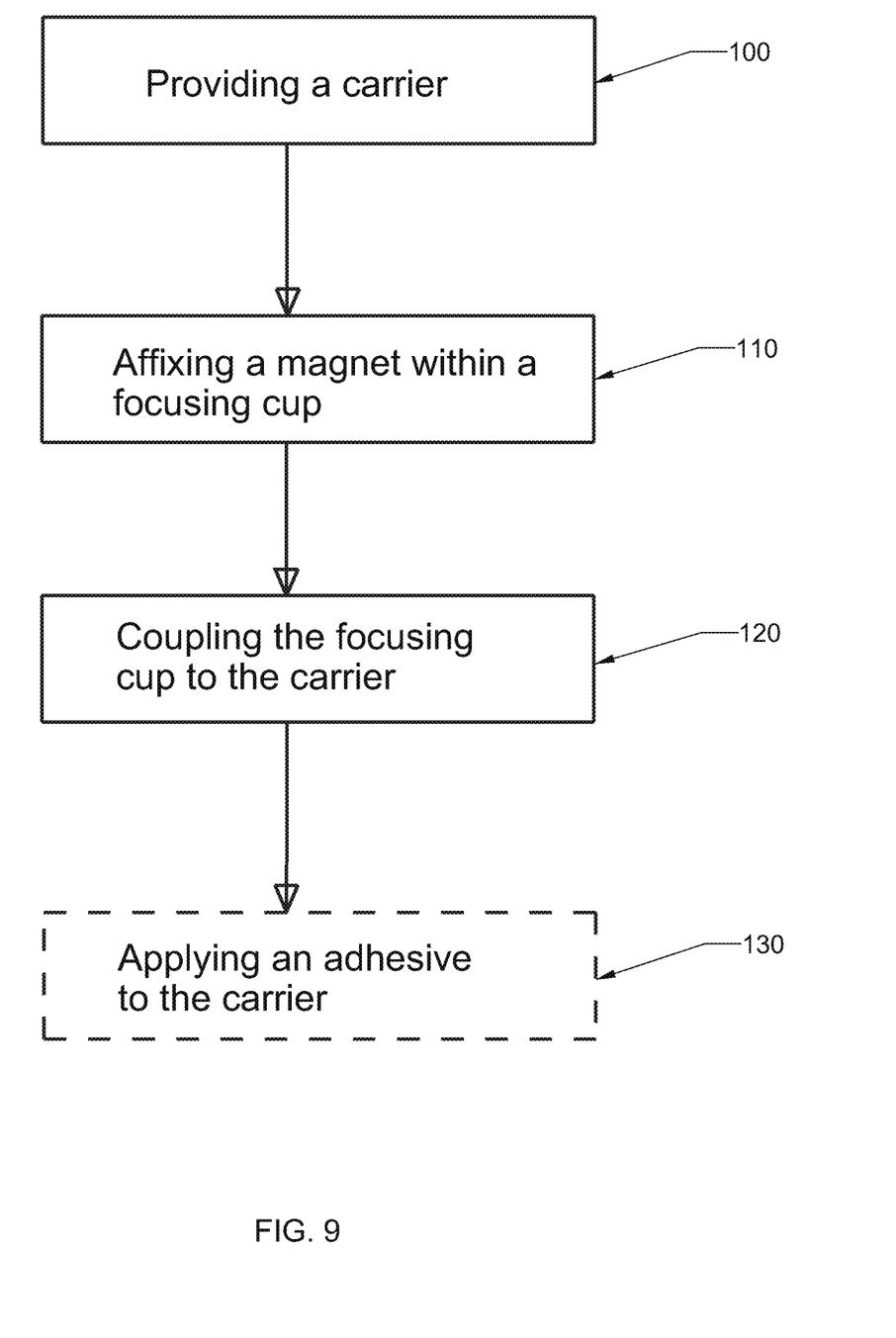
FIG. 9 is a flowchart of a method for assembling an apparatus for suspending an item according to an example embodiment.

FIG. 9 is a flowchart of an example method for assembling an apparatus for suspending an item. In this regard, the example method may include providing a carrier at 100, where the carrier includes an aperture. The example method my further include affixing a magnet within a cavity of a focusing cup at 110, where the focusing cup is comprised of a ferrous material. Additionally, at 120, the example method may include coupling the focusing cup to the carrier. In this regard, the magnet may be disposed within the cavity of the focusing cup such that an attraction surface of the magnet is exposed by an opening of the cavity and the aperture of the carrier to permit direct contact between the magnet and the item. Further, the focusing cup may be formed to focus a magnetic field of the magnet towards the attraction surface of the magnet. One of skill in the art would appreciate, that rather than employing a focusing cup, a focusing member in the form of a focus plate may be included. The focusing plate would not include walls that form a cavity and therefore the attraction surface of the magnet would extend beyond the front surface of the carrier, but no portion of the focusing plate would extend beyond the front surface of the carrier.

According to some example embodiments, the example method may further include applying an adhesive to the carrier at 130 for attaching the apparatus to a ceiling surface within a space or container. Further, according to some example embodiments, the example method may additionally or alternatively include affixing the magnet within the focusing cup, where the focusing cup defines a lip about the opening of the cavity of the focusing cup, and where the attraction surface of the magnet is recessed into the cavity relative to the lip of the focusing cup. The example method may additionally or alternatively include coupling the focusing cup to the carrier, where the carrier includes a seat and where the focusing cup includes a ledge. In this regard, the ledge of the focusing cup may engage the seat of the carrier to couple the focusing cup to the carrier. According to some example embodiments, coupling the focusing cup may additionally or alternatively include coupling the focusing cup to the carrier, where the seat of the carrier may be disposed within an interior surface of a protruding feature of the carrier.

According to some example embodiments an apparatus for suspending an item is provided that comprises a carrier including an aperture. The apparatus may further comprise a focusing member coupled to the carrier, where the focusing member is comprised of a ferrous material. The apparatus may further comprise a magnet disposed on the focusing member such that an attraction surface of the magnet is exposed by the aperture of the carrier to permit direct contact between the magnet and the item. Further, the focusing member may be formed to focus a magnetic field of the magnet towards the attraction surface. According to some example embodiments, the focusing member may be a focusing cup or a focusing plate.

According to some example embodiments, a method of assembling an apparatus for suspending an item may comprise providing a carrier, where the carrier including an aperture. The method may further comprise affixing a magnet to a focusing member, where the focusing member is comprised of a ferrous material. The method may further comprise coupling the focusing member to the carrier, where the magnet is disposed such that an attraction surface of the magnet is exposed by the aperture of the carrier to permit direct contact between the magnet and the item. Further, the focusing member may be formed to focus a magnetic field of the magnet towards the attraction surface. According to some example embodiments, the focusing member may be a focusing cup or a focusing plate.

Many modifications and other example embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific example embodiments disclosed and that modifications and other embodiments are intended to be included within the scope of this disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of this disclosure. In this regard, for example, different combinations of elements and/or functions than those explicitly described above are also contemplated as may be set forth in some of this disclosure. Although specific terms are employed herein, they are used in a generic and descriptive sense only and not for purposes of limitation.

What is claimed is:

1. An apparatus for suspending an item comprising:
a carrier;
a focusing member coupled to the carrier, the focusing member being comprised of a ferrous material; and
a magnet disposed in physical contact with the focusing member such that an attraction surface of the magnet is exposed to permit direct contact between the magnet and the item;
wherein the focusing member is formed as a focusing cup having side surfaces and a bottom surface that form a cavity, wherein the magnet is received into the cavity of the focusing cup;
wherein the ferrous material of the focusing member is formed to affect and focus a magnetic field of the magnet towards the attraction surface such that a maximum magnetic field is oriented toward a location where the item suspends.

2. The apparatus of claim 1 wherein the magnet is magnetized axially about a center point of the attraction surface of the magnet.

3. The apparatus of claim 1 further comprising an adhesive applied to the carrier for attaching the apparatus to a surface.

4. The apparatus of claim 3 wherein the adhesive is further applied to the focusing member to secure the focusing member to the carrier.

5. The apparatus of claim 1 wherein the attraction surface of the magnet does not physically contact the focusing member.

6. The apparatus of claim 1, wherein the carrier includes a seat; and wherein the focusing member includes a ledge, the ledge of the focusing member being coupled to the seat of the carrier.

7. The apparatus of claim 6, wherein the seat of the carrier is disposed within an interior surface of a chamber in the carrier.

8. The apparatus of claim 7, wherein a lip of the focusing member extends beyond a protruding feature of the chamber.

9. The apparatus of claim 1, wherein a depth of the cavity of the focusing cup is greater than a height of the magnet.

10. The apparatus of claim 1, wherein the carrier includes a plurality of chambers configured to receive a respective focusing member.

11. An apparatus for suspending an item comprising:
a carrier;
a focusing cup coupled to the carrier, the focusing cup being comprised of a ferrous material and having side surfaces and a bottom surface that form a cavity; and
a magnet having a magnetic field, the magnet being disposed within the cavity of the focusing cup;
wherein the ferrous material of the focusing cup affects a magnetic field of the magnet.

12. The apparatus of claim 11 wherein the ferrous material of the focusing cup focuses the magnetic field of the magnet such that a maximum magnetic field is oriented toward a location where the item suspends.

13. The apparatus of claim 11 wherein the magnet is disposed in physical contact with the focusing cup.

14. The apparatus of claim 11 wherein the magnet and the focusing cup are configured to such that an attraction surface of the magnet is exposed to permit direct contact between the magnet and the item.

15. The apparatus of claim 11, wherein the carrier includes a chamber and a seat, wherein the seat is disposed within an interior surface of the chamber; and wherein the focusing cup includes a ledge, the ledge of the focusing cup being coupled to the seat.

16. The apparatus of claim 15, wherein a lip of focusing cup extends beyond a protruding feature of the chamber.

17. The apparatus of claim 11, wherein a depth of the cavity of the focusing cup is greater than a height of the magnet.

18. A system comprising:
a container having a ceiling; and
an apparatus coupled to the ceiling and configured to suspend an item, the apparatus comprising:
a carrier;
a focusing cup coupled to the carrier, the focusing cup being comprised of a ferrous material and having side surfaces and a bottom surface that form a cavity; and a magnet having a magnetic field, the magnet being disposed within the cavity of the focusing cup;

wherein the ferrous material of the focusing cup affects a magnetic field of the magnet.

19. The system of claim 18, wherein the carrier of the apparatus is integrated into the ceiling of the container.

20. The system of claim 18, wherein the container includes a plurality of walls and wherein the walls include temperature controlling insulation.

\* \* \* \* \*